Nov. 2, 1965  W. O. NIXON  3,215,159

PRESSURE DROP REGULATOR

Original Filed May 13, 1955

PRESSURE DROP REGULATOR

METERING VALVE

INVENTOR.
WILLIAM O. NIXON,
BY
Jerome P. Bloom
ATTORNEYS

United States Patent Office 3,215,159
Patented Nov. 2, 1965

3,215,159
PRESSURE DROP REGULATOR
William O. Nixon, Dayton, Ohio, assignor to Meldrum MacPetrie, Southfield, and James M. Roy, Jr., Huntington Woods, Mich.
Original application May 13, 1955, Ser. No. 508,145, now Patent No. 2,985,181, dated May 23, 1961. Divided and this application Feb. 15, 1961, Ser. No. 89,569
3 Claims.  (Cl. 137—501)

This invention relates to hydraulic devices and more particularly to metering devices of a type which may be arranged to operate as a computer. By way of example matering devices may take the form of a metering valve or a pressure drop regulator. In any event, embodiments of the invention serve to automatically function to impose a particular mathematical expression of an input signal on its output and the resultant output will be a slave to the input signal. "Droop" is eliminated in the function thereof.

It is to be understood that the invention disclosed herein, constitutes a division of that presented in U.S. application Serial No. 508,145, filed May 13, 1955, for Hydraulic Computer System now Patent No. 2,985,181, issused May 23, 1961.

In their preferred form, invention embodiments can be employed where signals can be derived from pressures or variables which can be converted to pressures; such as temperatures, which may be converted to pressure by means of a temperature bulb; or shaft speed, which may be converted into a pressure differential by means of a centrifuge or ball governor to produce a mechanical force on a bellows or diaphragm; or similar variables.

The present invention has application to systems which employ hydraulic pressure in a manner analogous to the way in which plate voltage is employed in an electronic tube, the devices of the present invention being supplied with signal pressures analogous to the signals applied to grids of electronic tubes, the signal pressures being arranged to develop outlet pressures and/or flows in the devices representing known functions; for example, algebraic expressions of the signal pressures which are being fed into the devices.

Further, devices of the present invention may be employed to compute and develop a mathematical or graphical expression of one or more input signals into their outputs which may involve addition, subtraction, multiplication, division, square roots, exponential functions having positive or negative exponents, either whole or fractional, in any function of one parameter to another, whether mathematical or diagrammatical, or any complex combination of the above with respect to signals received.

Devices according to the present invention may be advantageously applied to fuel systems of a power plant, and more particularly to aircraft power plants because of the computations inherently necessary in the case of such power plants dealing in altitude pressure, ram pressure, compressor inlet pressure, compressor outlet pressure, manifold pressure, ambient air temperature, ram temperature, compressor inlet temperature, compressor outlet temperature, true and corrected engine speeds, true and corrected fuel flow, and the like. However, it should be kept in mind that the application of the present invention is not so limited. Such is not intended. For example, the invention devices can also be arranged to compute and indicate true air speed or Mach number, using ambient pressure, ambient temperature, pitot pressure, or any other variables affecting the computation of true air speed.

Many of the metering devices heretofore employed to regulate and/or amplify a pressure, or a pressure drop, are highly complicated and are generally characterized by "droop" and non-linearity. This is due to the effect of extraneous factors such as spring rates and variations in supply pressures, drain pressures and the like. Efforts are usually made to compensate for these factors by means of involved controls requiring special contouring and employment of cams, levers and the like. The present invention eliminates the necessity for a considerable amount of this.

For the purpose of this disclosure it should be understood that "droop" is the error in the output of a system which results from parameters not inherent in the signals introduced in the system, such as temperature and supply and drain pressure.

Metering devices of the prior art may employ pistons or diaphragms to receive the forces associated with various hydraulic pressures in the systems in which they are incorporated. The use of pistons is generally disadvantageous since they are affected by friction which is particularly significant if they are of large circumference and close fit in their cylinder bores to minimize leakage. Moreover, leakage is generally always present. The use of diaphragms eliminates the effects of sliding friction and leakage incident to the use of pistons. However, unless the normal diaphragms are thin, their distortion requires a force which results in inacccuracy in results transmitted. Moreover, thin diaphragms are normally limited in rupture strength and can only be used to separate pressures of small differentials.

The present invention avoids the above noted problems since the devices provided thereby are essentially computers and not necessarily flow regulators proper. Their simplicity and accuracy is such they can be employed to affect a flow regulator or flow system and cause it to function properly without the need for heavy diaphragms or large pistons and they eliminate "droop" in the proces.

It is a primary object of the present invention to provide novel basic metering devices which can be employed independently or in combination, each device being capable of considerable variation in dimension, effective area, and area ratios, and each being capable of a wide variation of use within many different schematic systems, but each having one basic function which can be coupled into the different schematic systems to impose a particular mathematical expression of input signals on their output in a manner to make their output a slave to the input signals.

Another object of the invention is to provide metering devices having precision control features.

A further object of the invention is to provide novel metering devices which may selectively represent a metering valve, pressure drop regulator, or the like, each of which has particular functional characteristics related to precise mathematical expressions of input signals.

A further object of the invention is to provide metering devices which may be employed singly or in combination in various schematic systems to perform required computations.

Another object of the invention is to provide devices as above mentioned which can be accurately produced in relatively small size to be employed for qualitative computation and in a manner to require only a small amount of hydraulic power.

A still further object of the invention is to provide miniature computer units which may be duplicated on a larger scale to define main quantitative control elements arranged to accurately respond to the miniature computing units and systems thereof.

An additional object of the invention is to provide metering devices capable of functioning as computer units possessing the advantageous structural features, the inherent meritorious characteristics and the means and mode of operation herein described.

With the above primary and other incidental objects in view which will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein are illustrated preferred but not necessarily the only forms of embodiment of the invention, FIG. 1 is a top view of a pressure drop regulator element constructed in accordance with the present invention to regulate the pressure drop across a fixed or variable orifice;

The invention can be best described with particular reference to the accompanying drawings. The embodiments illustrated will be specifically described as to their individual character and to show their unique function.

Figure 3:
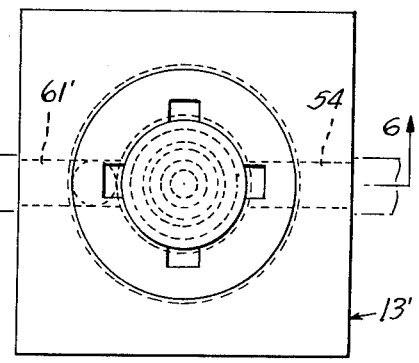
FIG. 3 is a top plan view of a metering valve element constructed in accordance with the present invention, providing an orifice area which is a function of a signal pressure differential applied to the element.
Figure 4:
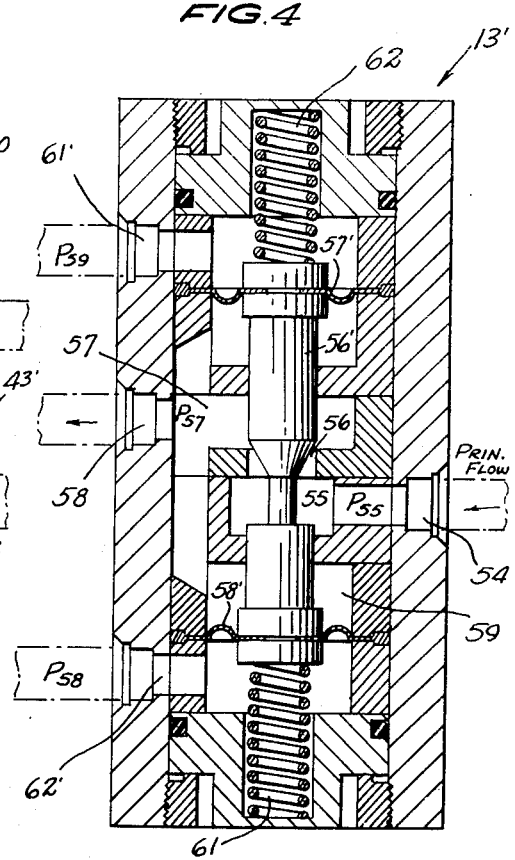
FIG. 4 is a vertical cross sectional view taken through the metering valve of FIG. 5 on the line 6—6 of FIG. 3.

Referring to FIGURES 3 and 4 of the drawings, a metering valve 13' is shown, the purpose of which is to provide an orifice area which is a function of but not necessarily a multiple of a differential signal pressure applied thereto. The valve 13', as shown, provides for a principal or supply flow through an input passage 54 to a chamber 55, from the chamber 55 through a metering orifice 56 to a chamber 57 and from the chamber 57 through an output passage 58. The size of the metering orifice 56 is varied according to the movement of a metering pin 56' which is suitably contoured at its orifice defining portion. The pin 56' has its opposite end portions respectively secured to diaphragms 57' and 58' which bridge the interior of valve 13' to respectively provide the upper and lower extremities of the chamber 57. The diaphragms together with the valve body define pressure chambers to either end of the pin 56'. As seen in FIGURE 6 of the drawings, the portion of the chamber 57 adjacent the diaphragm 58' is identified by the numeral 59. Positioned in the aforementioned pressure chambers and acting on the respective ends of the metering pin 56' are opposed coil springs 62 and 61.

As the chamber 57 is inclusive of the space 59, it may be said that there is a general uniform pressure $P_{57}$ throughout the chamber 57 equally applying to the respective diaphragms 57' and 58'. As all areas subjected to this pressure $P_{57}$ are balanced, no net force is applied on the metering pin 56' resulting from this pressure. Similarly within the chamber 55, the pressure $P_{55}$ applies equally to opposite surfaces on the pin 56' of equal cross-sectional dimension so there is no net force resulting therefrom on the metering pin. By suitably contouring the pin 56' and providing suitable linear spring rate in the springs 61 and 62, an effective orifice 56 may be obtained which is a predetermined function of the differential signal pressure $P_{S8} - P_{S9}$, the difference between a first signal pressure $P_{S9}$ applied through a passage 61' in the valve body 13' to the pressure chamber above the diaphragm 57' and a second signal pressure $P_{S8}$ applied through a passage 62' in the valve body 13' to the chamber below the remote diaphragm 58'. Thus, the metering valve illustrated can provide an orifice area which is a selected function of a differential signal pressure applied to opposite ends of the metering pin 56'.

Figure 1:
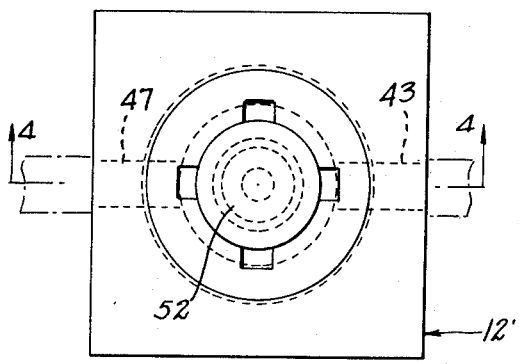
Figure 2:
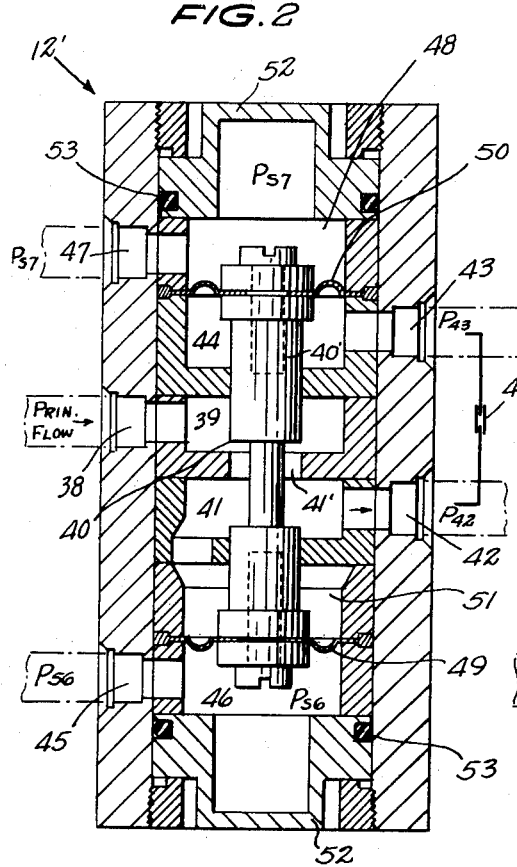
FIG. 2 is a vertical cross-sectional view of the pressure drop regulator taken on line 4—4 of FIG. 1.

Referring now to FIGURES 1 and 2, the reference numeral 12' generally designates a "pressure drop regulator" whose purpose is to regulate the pressure drop across a fixed or variable orifice, such as the orifice 43' shown diagrammatically in FIGURE 2. The pressure drop is to be controlled by and is to be a fixed multiple of a signal pressure differential.

The principal flow, which is to pass the above-mentioned orifice 43', enters the pressure drop regulator 12' through a passage 38, passes through a chamber 39, and passes the edge 40 of a valve 40' into a chamber 41 through the valve orifice 41'. From chamber 41 the flow passes through a passage 42 to the orifice 43'.

The upstream side of the orifice 43' will then have a pressure designated at $P_{42}$, while the downstream side of the orifice 43' will have a pressure designated as $P_{43}$. The pressure drop across the orifice 43' would then be $P_{42}-P_{43}$. Passage 43 leads to a space 44 in the pressure drop regulator below a diaphragm 50 to which one end of the valve 40' is centrally secured, as shown. Space 44 and passage 43 communicate with the downstream side of the orifice 43', so that space 44 is subject to pressure $P_{43}$.

The lower end of the pin 40' is centrally connected to a bottom diaphragm 49 having the same area as the top diaphragm 50.

A signal pressure $P_{S6}$ is fed through a passage 45 into the chamber 46 below the diaphragm 49. Another signal pressure $P_{S7}$ is supplied through a passage 47 into a chamber 48 above diaphragm 50. The diaphragms 49 and 50 have the same area, designated as $D_3$. The pressure $P_{S6}$ thus exerts pressure on diaphragm 49 resulting in a total force of $P_{S6}D_3$.

The pressure $P_{S7}$ exerts a force on the diaphragm 50 equal to $P_{S7}D_3$. The pressure $P_{42}$ in chamber 51 exerts a net force of $P_{42}(D_3-V_3)$ on diaphragm 49, while the pressure $P_{43}$ exerts a net force on diaphragm 50 of $P_{43}(D_3-V_3)$, where $V_3$ is the area of the valve pin 40'. It may be seen then that $$P_{43}(D_3-V_3)+P_{S6}D_3=P_{42}(D_3-V_3)+P_{S7}D_3$$

Therefore $$(P_{42}-P_{43})=(P_{S6}-P_{S7})\frac{D_3}{D_3-V_3}$$

and as $D_3$ divided by $D_3-V_3$ is a fixed value $(P_{42}-P_{43})$, the pressure drop across the aforementioned orifice 43', is a direct multiple of $(P_{S6}-P_{S7})$.

The above described arrangement is employed when it is desired to have the "pressure drop regulator" located upstream of the orifice 43'. Should it be desired to place the pressure drop regulator downstream of the said orifice, then the arrangement of the valve pin is merely reversed. Thus, after passing the orifice 43', the flow enters the pressure drop regulator through the passage 42 to the chamber 41, passing the valve edge 40 to chamber 39 and then passing to the passage 38. The passage 43 would be connected to the upstream side of the orifice 43'. Thus the pressure drop across the orifice 43' is $(P_{43}-P_{42})$.

Under these conditions $P_{S6}$ must now be considered as the lower of the pressure signals and $P_{S7}$ as the higher of the pressure signals. We now see that $$(P_{S7}+P_{42}(D_3-V_3)=P_{S6}D_3+P_{43}(D_3-V_3)$$

and thus $$(P_{S7}-P_{S6})\left(\frac{D_3}{D_3-V_3}\right)=P_{43}-P_{42}$$

the pressure drop across the aforementioned orifice 43'.

The pressure drop regulator 12' is provided with suitable end caps 52 and with sealing rings 53 of deformable resilient material, as shown in FIGURE 2.

For the purpose of understanding systems which may be selectively employed in accordance with the invention, it is essential to refer to the aforementioned co-pending application Serial No. 508,145.

It is illustratively shown, in the aforementioned United State Letters Patent 2,985,181, what the character of embodiments of the present invention may comprise as well as their use in effecting hydraulic computer systems. While specific embodiments, systems and applications of the invention have been disclosed, it should be readily apparent the invention, its application and embodiments are not so limited. Such is not intended.

Having thus described my invention, I claim:

1. A control valve, including a valve body, a valve element reciprocable in said body, a port in said body defining with a portion of said valve element a variable orifice, partitions in said body on opposite sides of said variable orifice slidably mounting said valve element and defining chamber means at opposite ends of said body, a diaphragm in one chamber means and connected to said valve element defining a first external and internal pressure chamber on opposite sides thereof, a diaphragm in the other chamber means connected to said valve element and defining a second internal and external pressure chamber on opposite sides thereof, pressures in said external chambers acting on said valve element through said diaphragms in opposed senses and pressures in said internal chambers acting on said valve element through said diaphragm in opposed senses, a passage for putting a principal flow of fluid through said body, said passage including said port, a fixed orifice in said passage in series relation to said variable orifice means for communicating said passage on the upstream and downstream sides of said fixed orifice respectively to said first and second internal pressure chambers, and independent means for communicating different signal pressures to said first and second external pressure chambers respectively.

2. A control valve according to claim 1, characterized in that said port and said portion of said valve element cooperating to define said variable orifice have square and sharp peripheries defining a sharp edged orifice.

3. A control valve according to claim 1, characterized in that the connection from said passage upstream of said fixed orifice to said second internal pressure chamber is accomplished within said valve body through an opening in an adjacent one of said partitions.

References Cited by the Examiner
UNITED STATES PATENTS

| | | | |
|---|---|---|---|
| 1,787,686 | 1/31 | Kerr | 137—501 |
| 2,217,635 | 10/40 | Bailey et al. | 137—501 XR |
| 2,255,787 | 9/41 | Kendrick | 137—501 XR |
| 2,317,293 | 4/43 | Newell | 235—61 |
| 2,514,514 | 7/50 | Puster | 137—501 |
| 2,719,021 | 9/55 | Seefluth | 251—25 |
| 2,727,714 | 12/55 | Frisch | 251—25 |
| 2,803,264 | 8/57 | Griswold | 137—501 |
| 2,867,268 | 1/59 | Brown | 137—501 XR |
| 2,881,793 | 4/59 | Lee | 137—501 |
| 2,957,622 | 10/60 | Julley | 235—61 |

M. CARY NELSON, *Primary Examiner.*

MARTIN P. SCHWADRON, *Examiner.*